(No Model.)
E. WILLIAMS.
AUTOMATIC FLOATING MINNOW BUCKET.
No. 458,529. Patented Aug. 25, 1891.
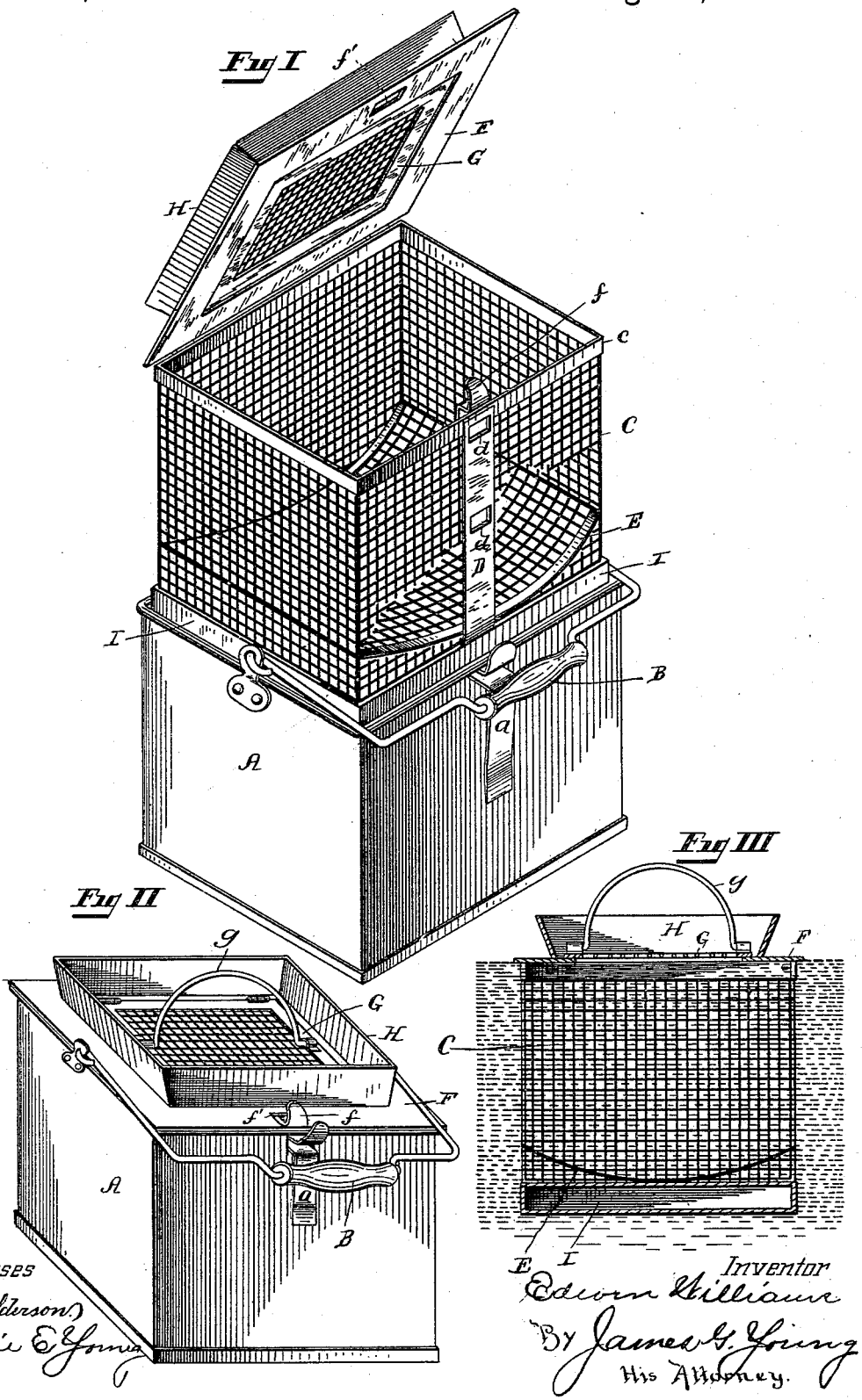

UNITED STATES PATENT OFFICE.

EDWIN WILLIAMS, OF KANSAS CITY, MISSOURI.

AUTOMATIC FLOATING MINNOW-BUCKET.

SPECIFICATION forming part of Letters Patent No. 458,529, dated August 25, 1891.

Application filed February 3, 1891. Serial No. 379,969. (No model.)

*To all whom it may concern:*

Be it known that I, EDWIN WILLIAMS, a citizen of the United States, residing at Kansas City, in the county of Jackson and State of Missouri, have invented certain new and useful Improvements in Floating Minnow-Buckets; and I do hereby declare the following to be a full, clear, and exact description of the invention, such as will enable others skilled in the art to which it appertains to make and use the same.

My invention relates to an improvement in floating minnow-buckets.

The object is to provide a bucket adapted to fishermen's use, which shall be equally useful for holding minnows, conveniently arranged for catching and preserving the life of the same, as well as adapted for holding jumping or crawling bait, also for floating in water when desired.

A further object is to provide a simple cage for bait, so constructed as to be used with the least possible waste of time to the operator.

It is also a great convenience over other methods, from the fact that it is perfectly noiseless in its operation, as well as self-acting, thereby avoiding alarm to surrounding fish.

A further object, in combination with said bucket, is to provide an ice receptacle and holder for regulating temperature when desired.

With these ends in view my invention consists in certain features of construction and combination of parts, as will be hereinafter described, and pointed out in the claims.

In the accompanying drawings, Figure I is a perspective view of the invention, showing the cage withdrawn from the can or bucket and its cover raised. Fig. II is a perspective view of the invention, showing it inclosed in the bucket and ready for transportion. Fig. III is a sectional view of the minnow-cage in submerged position in the bucket.

Referring to the drawings by letter, A represents the outer can or bucket provided with a handle B.

C is the cage, constructed of wire-gauze, said cage having its upper edge bound by a rim $c$ for holding said wire-gauze in place.

D is a metal strip or plate on the front of cage C, which is provided with openings $d\ d$, in which the spring $a$ operates.

E is a segmental wire-gauze bottom to the cage C. (See Figs. I and III.) F is the cover or lid to said cage, and is provided with a door G, which is also constructed of wire-gauze and provided with a handle $g$. The lid F has an opening $f'$, in which the clasp-spring $f$ operates for holding the lid in position.

H represents the ice-box formed on top of the lid F.

I is an air-tight chamber secured to the bottom of the cage C, and is for the purpose of floating said cage.

It will be noticed by the drawings that my invention consists of two essential parts, the bucket A and the cage C. The bucket A may be constructed of any metal, and of any size corresponding to and large enough to inclose in quite close proximity the cage C. The bucket is further provided with a spring-catch $a$, with a horizontal end of a lever, which fits into corresponding openings $d\ d$ in strip D, conveniently arranged on front of cage for holding it at any desired depth in the bucket.

The cage proper consists of a box-shaped wire-gauze, preferably with a concave bottom, having an air-tight chamber to float the cage. The cover to said cage is any ordinary cover, as F, (seen in the drawings,) with a secondary wire-gauze-cage door G opening with a spring, conveniently arranged, so that the handle to the cage and the spring may be touched and operated simultaneously. This wire-gauze door G is constructed of smaller dimensions than the door proper to prevent crawling or jumping bait from escaping, and need only be large enough to admit of the free insertion of any hand into the cage for the purpose of catching bait. When necessary to get a full view of the contents of the cage, the door F may be opened. The door F is secured to the cage C by any ordinary hinge, and the door G is secured to the door F in like manner. Both are more easily operated by the handle to F and the springs securing F and G. The cage C, being provided with the air-chamber I, has to be pressed down in order to put it in submerged position in A, when it is held thus by the spring $a$, fitting into corresponding openings $d\ d$. When the fisherman desires bait, he opens the spring $a$, the cage rises to the surface, so that the bait is temporarily out of the water, when, touching the spring $f$, either door is opened for the insertion of the hand.

Having thus fully described my invention, what I claim as new, and desire to secure by Letters Patent, is—

1. In combination with any ordinary metallic bucket, a wire-gauze cage having an air-tight-chamber bottom, the inside bottom of the cage preferably of concave formation for the concentration of bait near the center and greater rapidity of grasping same, said cage being provided with a perpendicular plate and opening, into which a horizontal projection from a spring on the bucket is inserted for holding the cage at any desired depth of submersion or releasing it when desired, substantially as set forth.

2. In combination with any ordinary metallic bucket, a wire-gauze cage having an air-tight-chamber bottom, the inside bottom of the cage preferably of concave formation for the concentration of bait near the center and for greater rapidity of grasping the same, said cage being provided with a perpendicular plate and opening, into which a horizontal projection from a spring in the bucket is inserted for holding the cage at any desired depth of submersion or releasing it when desired, and a gauze cover or lid to said cage provided with a gauze door operated by a spring for convenience in getting at the bait or other contents, substantially as set forth.

3. In combination with any ordinary metallic bucket, a wire-gauze cage having an air-tight-chamber bottom, the inside bottom of the cage preferably of concave formation for the concentration of bait near the center and for the greater rapidity of grasping same, said cage being provided with a perpendicular plate and opening, into which a horizontal projection from a spring on the bucket is inserted for holding the cage at any desired depth of submersion or releasing it when desired, a gauze cover or lid to said cage provided with a gauze door operated by a spring for greater convenience in getting at the bait or contents of the bucket, and an ice-receptacle on the top of the lid for the purpose of holding ice to regulate the temperature, substantially as set forth.

In testimony whereof I affix my signature in presence of two witnesses.

EDWIN WILLIAMS.

Witnesses:
BESSIE E. YOUNG,
DAISY B. SMALLEY.